(12) United States Patent
Palakodety et al.

(10) Patent No.: US 9,047,363 B2
(45) Date of Patent: Jun. 2, 2015

(54) TEXT INDEXING FOR UPDATEABLE TOKENIZED TEXT

(75) Inventors: Ravi Palakodety, Redwood City, CA (US); Wesley Lin, West Covina, CA (US); Neha Narkhede, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 568 days.

(21) Appl. No.: 12/967,419

(22) Filed: Dec. 14, 2010

(65) Prior Publication Data

US 2012/0150864 A1 Jun. 14, 2012

(51) Int. Cl.
*G06F 7/00* (2006.01)
*G06F 17/30* (2006.01)

(52) U.S. Cl.
CPC .... *G06F 17/30613* (2013.01); *G06F 17/30017* (2013.01)

(58) Field of Classification Search
CPC .......... G06F 17/3002; G06F 17/30097; G06F 17/30312; G06F 17/30321; G06F 17/30619; G06F 2221/0711

USPC ........ 707/696, 719–720, 722–723, 741–742, 707/754, 759, 769

See application file for complete search history.

(56) References Cited

U.S. PATENT DOCUMENTS

| | | | | |
|---|---|---|---|---|
| 6,003,042 A * | 12/1999 | Melahn | ................................. | 1/1 |
| 7,634,517 B1 * | 12/2009 | Burrows et al. | ........................ | 1/1 |
| 2009/0077554 A1 * | 3/2009 | Reed et al. | ..................... | 718/101 |
| 2010/0257172 A1 * | 10/2010 | Lambert et al. | ............... | 707/739 |
| 2012/0130995 A1 * | 5/2012 | Risvik et al. | .................. | 707/723 |

\* cited by examiner

*Primary Examiner* — Jason Liao
*Assistant Examiner* — Berhanu Mitiku
(74) *Attorney, Agent, or Firm* — Kraguljac Law Group, LLC

(57) ABSTRACT

Systems, methods, and other embodiments associated with text indexing for updateable tokenized text are described. One example method includes receiving revised tokenized text intended to replace existing tokenized text in an indexed document. Token location information corresponding to the revised tokenized text is stored in an allocated free space portion of a text index posting.

18 Claims, 7 Drawing Sheets

TEXT INDEXING FOR UPDATEABLE TOKENIZED TEXT

BACKGROUND

A text index is a data structure used to facilitate full-text search over unstructured text. The structure of a text index is typically an inverted index that maps individual tokens to a list of documents that contain them. Each token and its associated list is called a posting. When users issue full-text queries, the inverted index postings are consulted to efficiently find documents that contain tokens in the queries. When documents that have been indexed are revised, the entire documents are typically completely re-indexed, which can be expensive and time-consuming.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
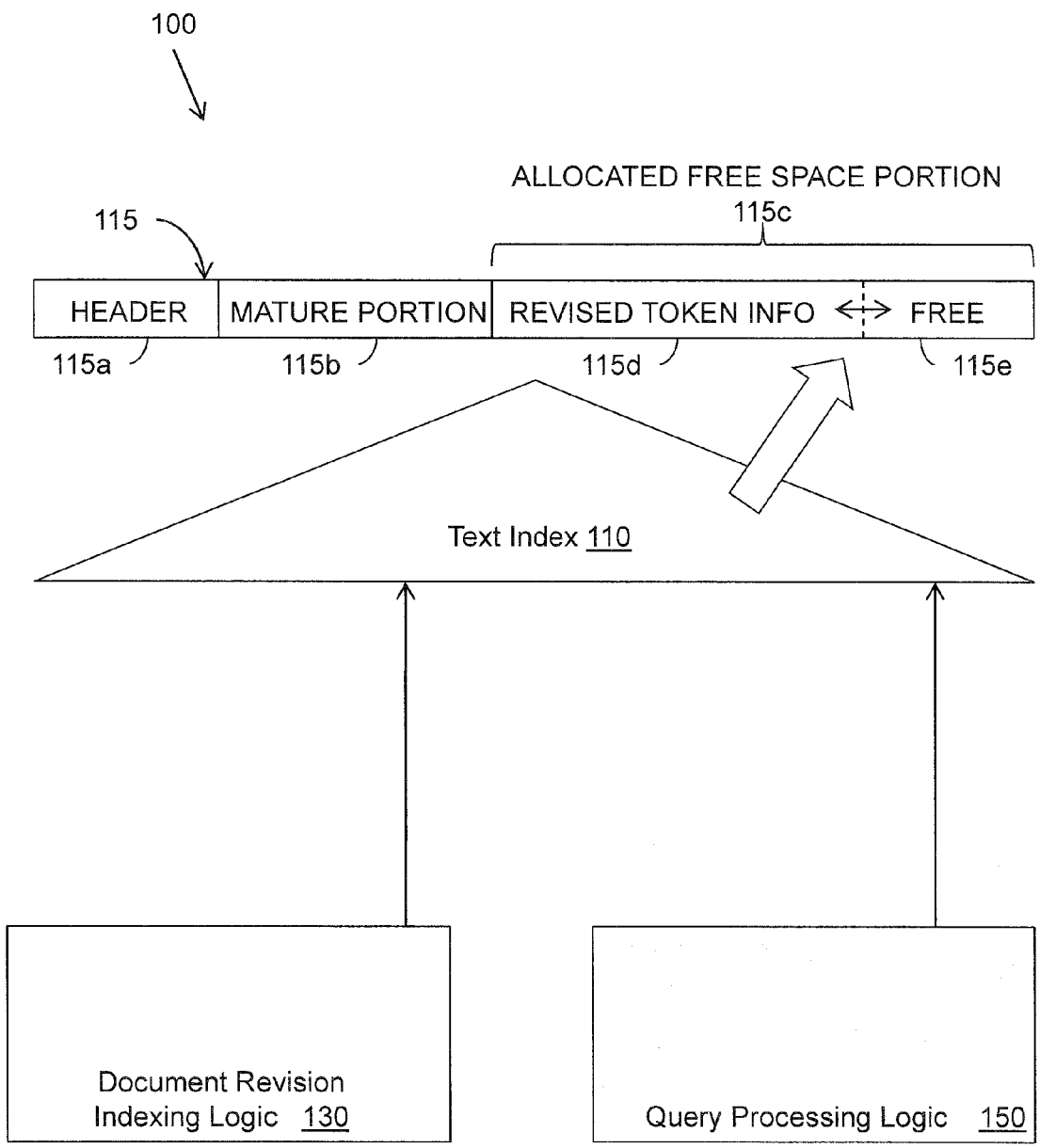
FIG. 1 illustrates an example system associated with text indexing for updateable tokenized text.

When documents that have been indexed are updated, typically each entire document must be re-indexed. Because the inverted index is a one-way mapping of tokens to documents, it is infeasible to locate tokens affected by revisions to a single document. In addition, to support efficient query processing, the postings are often sorted in order of document identifier, making in-place updates difficult. Updating the inverted index to reflect the updated section of the document involves finding all of the tokens for the section of the document that changed, and modifying the postings for the tokens.

Due to the difficulties in maintaining an index for tokenized text that is revised often, some search systems provide indexes for non-tokenized text in frequently updated documents. However, the indexes for non-tokenized text typically support only exact matches and do not support many query operators. Other systems allow for revisions to tokenized text by accumulating document revisions and periodically rewriting the text index. However, this approach sacrifices accuracy because results retrieved by searching will be based on outdated content for any documents that have been revised since the last index rewrite.

Text indexing for updateable tokenized text can be provided using the techniques described herein. A posting structure that includes an allocated free space portion for appending revised tokenized text information allows for quick writing of index information for revised tokenized text. A forward index that maps documents to tokens may be maintained to enable efficient location of postings that reflect an old state of a revised document for invalidation. Search results from the allocated free space portion may be sorted on the fly during query processing and merged with search results from a mature portion of the posting to return results to a query.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, is a physical component, examples of which include hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates an example embodiment of a search system 100 configured for text indexing for updateable tokenized text. The search system 100 includes a document revision logic 130 and a query processing logic 150. The search system 100 stores token location information for documents in a text index 110 that maps tokens to documents that contain them. The text index 110 includes a posting for each token present in a document in the search system. The posting includes an entry for each document that includes the token as well as the locations of the token within the document. To facilitate fast query processing, the posting may be stored in a physically contiguous manner.

An example posting structure 115 is illustrated in FIG. 1. The posting structure includes a header 115a that indentifies the token with which it is associated. The header also includes pointers to a mature portion 115b and an allocated free space portion 115c. The mature portion 115b includes location information for the token as recorded in a most recent rewriting of the posting. Thus, the mature portion 115b may be sorted and/or compressed. For example, the mature portion 115 may be sorted by document identifier. The allocated free space portion 115c includes revised token location information 115d and free space 115e. As revised token location information is added to the posting in the allocated free space portion 115c, the free space 115e shrinks. When the posting is rewritten to merge revised token location information into the mature portion 115b, a new free space 115c is allocated at the end of the new posting.

The document revision indexing logic 130 receives revised tokenized text that includes new tokens for a document in the search system. The document revision logic 130 is configured to store location information for the new tokens in the allocated free space portion 115c of the postings 115 for the new tokens. The allocated free space portion 115c of each posting provides a place to simply append location information for revised tokenized text without rewriting the entire posting to include the new location information in its proper position within the mature portion 115b.

The query processing logic 150 is configured to access the allocated free space portion 115c of the postings and the mature portion 115b of the postings to return results to queries. In this manner, search results can reflect an up-to-date state of the documents.

Figure 2:
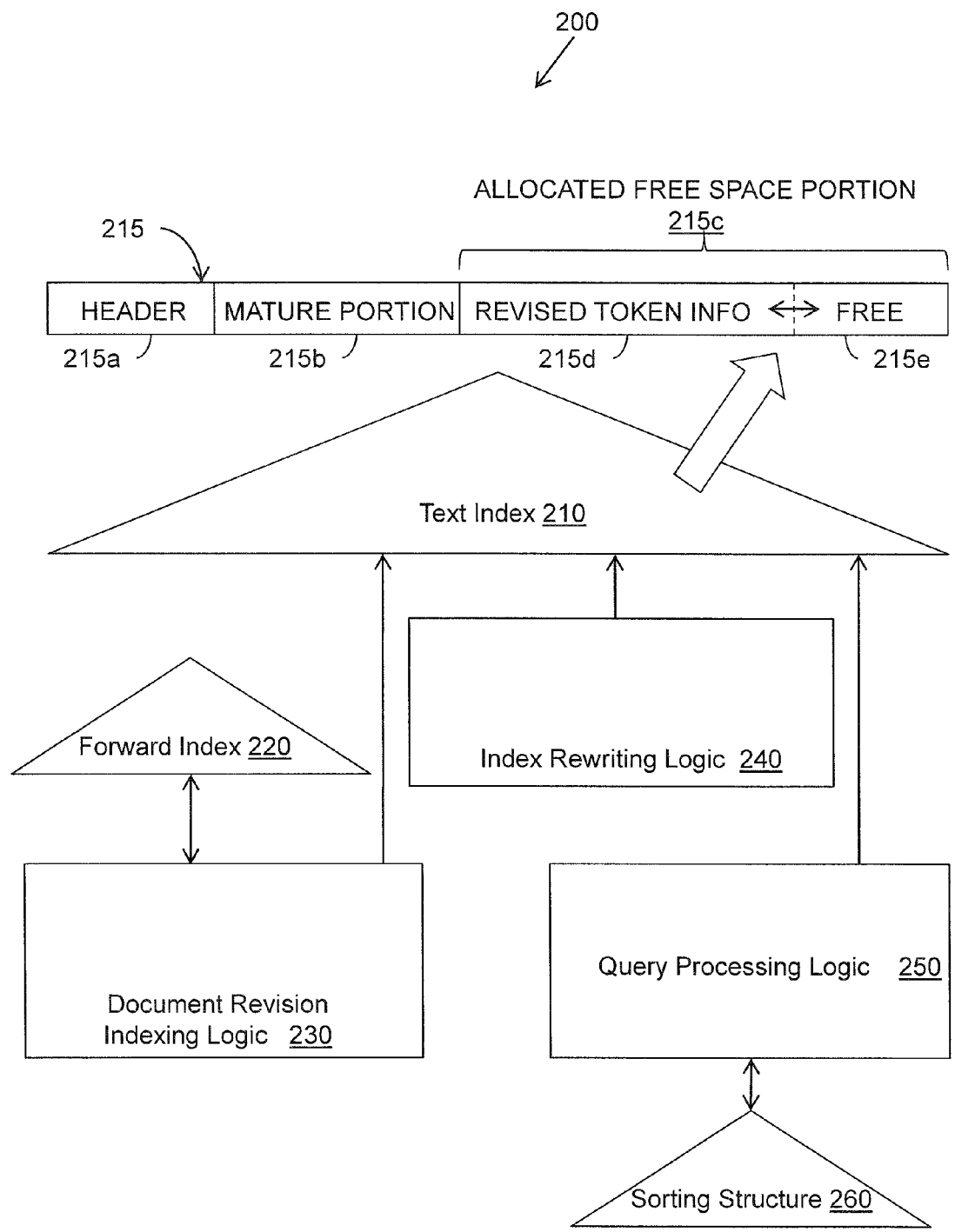
FIG. 2 illustrates an example system associated with text indexing for updateable tokenized text.

FIG. 2 illustrates an example embodiment of a search system 200 configured for text indexing for updateable tokenized text. The search system 200 includes a document revision logic 230, a query processing logic 250, and an index rewriting logic 240. The search system 200 stores token location information for documents in a text index 210 that maps tokens to documents that contain them. The text index 210 includes a posting structure 215 similar to the posting structure 115 illustrated in FIG. 1. The posting structure 215 includes a header 215a, a mature portion 215b, and an allocated free space portion 215c. The allocated free space portion 215c includes revised token location information 215d and free space 215e.

In addition to storing location information for new tokens in an indexed document, the document revision indexing logic 230 is configured to map documents in the search system to tokens contained in the documents in a forward index 220. The document revision indexing logic 230 is configured to consult a forward index entry for an indexed document being modified with revised tokenized text to locate text index postings for old tokens that make up the existing tokenized text in the document. The document revision indexing logic 230 then retrieves the text index postings for the old tokens from the text index 210 and invalidates entries associated with the indexed document by recording the invalidation in the allocated free space of the retrieved postings.

The document revision indexing logic 230 is configured to rewrite the entry for the indexed document in the forward index to map the new tokens in the revised tokenized text to the indexed document. The forward index 220 facilitates quickly retrieving all postings that correspond to old tokens in the document so that the invalidation can be recorded. The forward index 220 saves processing time as compared to searching through each posting in the text index 210, which maps tokens to documents.

The index rewriting logic 240 is configured to periodically rewrite the text index posting. To accomplish this, the index rewriting logic 240 is configured to remove the revised token location information 215d from the allocated free space portion 215c. The index rewriting logic 240 sorts the revised token location information according to document identifier. The sorted revised token location information is then inserted into the mature portion 215d. After merging the revised token location information into the mature portion 215b, the index rewriting logic 240 allocates memory for the allocated free space portion 215c of the posting so that location information for subsequently received revised tokenized text can be appended to the posting. The allocated free space portion 215c may be physically contiguous with the rest of the posting.

The query processing logic 250 is configured to access the text index posting header 215a to determine a beginning memory location for the allocated free space portion of a posting corresponding to a query token. To facilitate query processing, the query processing logic 250 sorts the revised token location information by reading the revised token location information in the allocated free space portion into a sorting structure 260 and sorting the revised token location information using the sorting structure 260. The sorting structure 260 may be, for example, a skiplist, a balanced binary tree, or other appropriate structure that facilitates sorting during execution of a query.

To return results to a query, the query processing logic 250 performs a sorted merge on document identifiers that were identified by accessing the mature portion and the allocated free space portion of the text index posting. When the query processing logic 250 encounters an invalidation notation in a posting, the query processing logic 250 removes the associated document identifier from the results set.

Text indexing for updateable tokenized text may be employed for relatively small sections of an overall document that have been designated as updateable. For example, a web page that has relatively static content other than a comment box that provides up-to-date information could benefit from text indexing for updateable tokenized text. The comment box may be designated as updateable and subject to text indexing as described herein while the rest of the web page is not. Since the comment box will be updated much more often than the rest of the web page, result accuracy will be maintained without overtaxing resources used to perform indexing.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
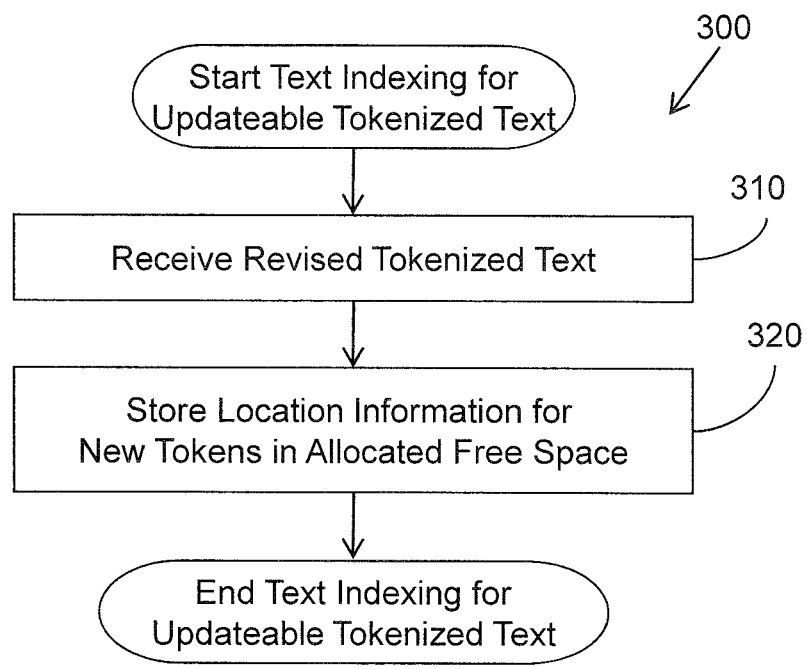
FIG. 3 illustrates an example method associated with text indexing for updateable tokenized text.

FIG. 3 illustrates an example embodiment of method 300 for performing text indexing for updateable tokenized text. The method includes, at 310, receiving revised tokenized text comprising one or more new tokens. The revised tokenized text is intended to replace existing tokenized text in an indexed document that is being processed by a search system. In the search system, token location information is stored in a text index that includes postings that map tokens to documents that contain the tokens. The postings include a mature portion compiled at a last posting rewrite. At 320 token location information corresponding to the revised tokenized text is stored in an allocated free space portion of postings corresponding to the one or more new tokens.

Figure 4:
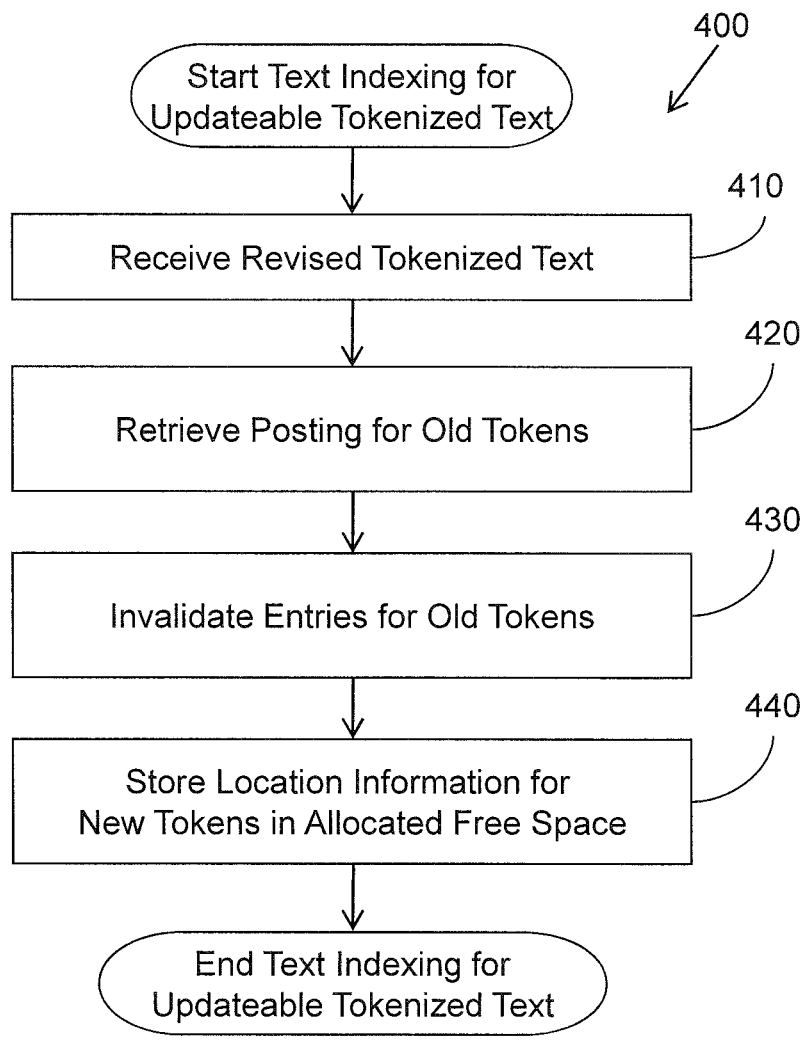
FIG. 4 illustrates another example method associated with text indexing for updateable tokenized text.

FIG. 4 illustrates an example embodiment of method 400 for performing text indexing for updateable tokenized text. The method includes, at 410, receiving revised tokenized text comprising one or more new tokens. At least one text index posting for old tokens in the existing tokenized text is retrieved at 420. At 430 entries in the posting associated with the indexed document are invalidated by recording an invalidation notation in the allocated free space portion of the at least one retrieved posting. At 440 token location information for the revised tokenized text is stored in an allocated free space portion of postings corresponding to the one or more new tokens.

Figure 5:
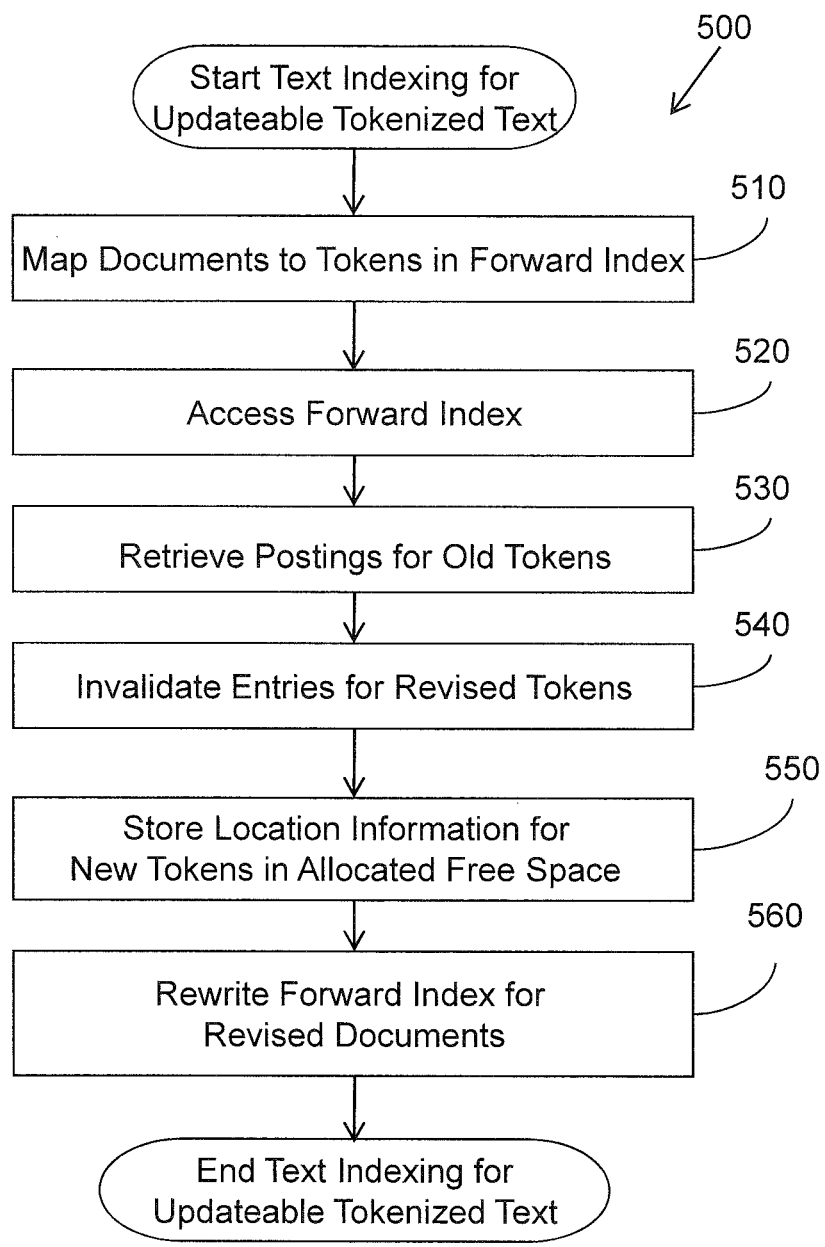
FIG. 5 illustrates another example method associated with text indexing for updateable tokenized text.

FIG. 5 illustrates an example embodiment of method 500 for performing text indexing for updateable tokenized text. The method includes, at 510, mapping documents in the search system to tokens contained in documents in a forward index. At 520, a forward index entry for an indexed document is accessed to locate text index postings for old tokens in the existing tokenized text. At least one text index posting for old tokens in the existing tokenized text is retrieved at 530. At 540 entries in the posting associated with the indexed document are invalidated by recording an invalidation notation in the allocated free space portion of the at least one retrieved posting. At 550 token location information for the revised tokenized text is stored in an allocated free space portion of postings corresponding to the one or more new tokens. At 560 the forward index is rewritten for the revised documents to reflect the new tokens in the revised tokenized text.

Figure 6:
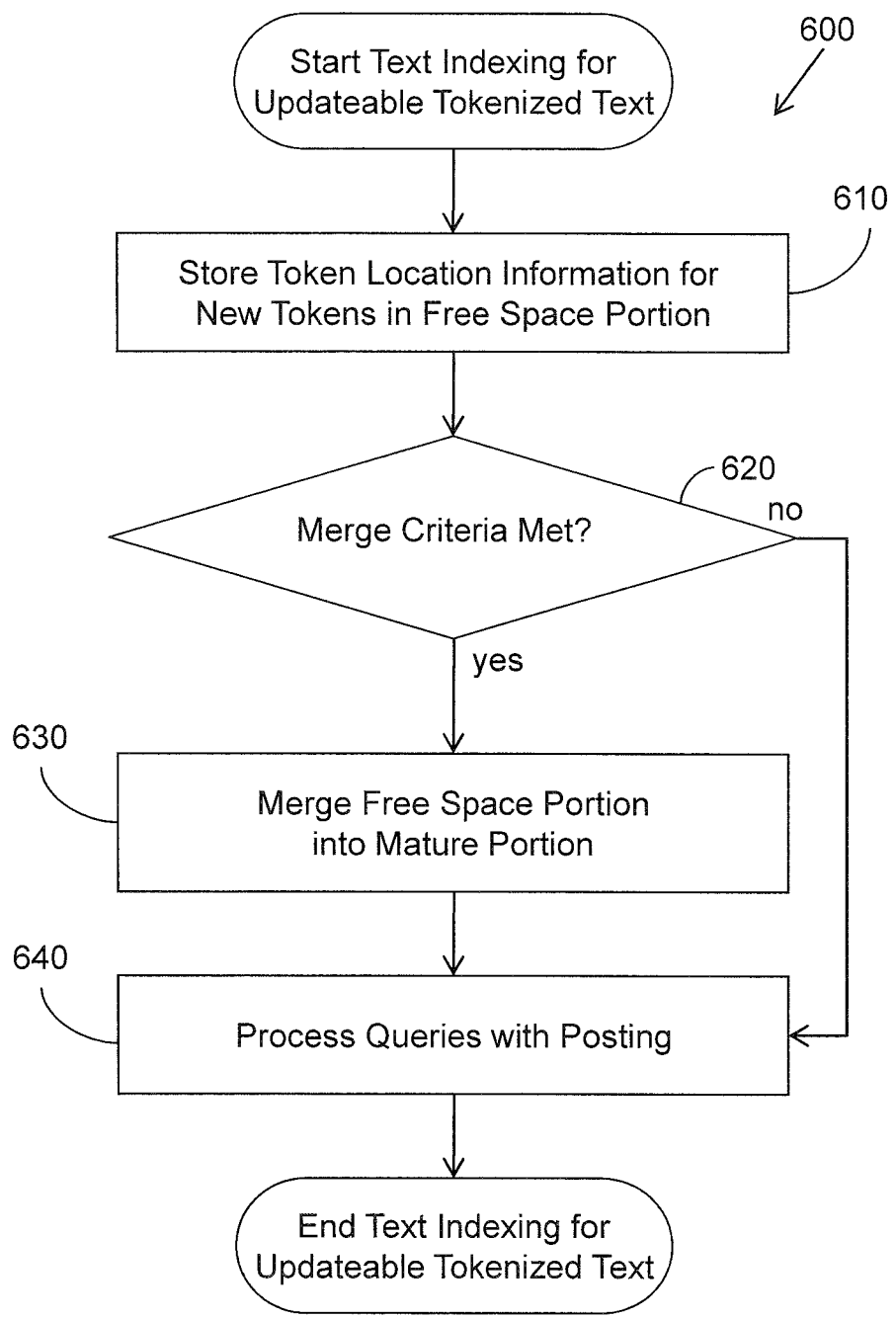
FIG. 6 illustrates another example method associated with text indexing for updateable tokenized text.

FIG. 6 illustrates an example embodiment of method 600 for performing text indexing for updateable tokenized text. The method includes, at 610, storing token location information corresponding to revised tokenized text in an allocated free space portion of postings corresponding to one or more new tokens. At 620 merge criteria is checked and if the criteria is not met, at 640 queries continue to be processed using the postings for the new tokens. If the merge criteria is met, at 630 the revised token location information in the allocated free space portion is merged into the mature portion.

The merge criteria may include a minimum threshold for an amount of free space remaining in the allocated free space portion. Thus, when the allocated free space portion becomes full of appended revised location information, the merge process may be initiated. The merge process involves creating a new posting that includes a new mature portion and allocated free space portion. Then the old posting and the old free space are deleted. Thus the mature posting and the allocated free space portion should be physically contiguous with one another.

At 640 queries are processed using the postings for the new tokens. Processing of queries may include receiving a query that includes a query token. At least one text index posting corresponding to the at least one query token is retrieved from the text index. The mature portion and the allocated free space portion of the at least one text index posting are accessed to identify documents that contain the at least one query token. The identified the documents are returned in response to the query.

To access the allocated free space portion a text index posting header may be consulted to determine a beginning memory location in the text index posting for the allocated free space portion. To further facilitate query processing, the revised token location information in the allocated free space portion may be sorted according to document identifier by reading the revised token location information into a sorting structure. A sorted merge may then be performed during query execution on document identifiers that were identified by accessing the mature portion of the text index posting and document identifiers that were identified by accessing the allocated free space portion.

While FIGS. 3-6 illustrate various actions occurring in serial, it is to be appreciated that various actions illustrated in FIGS. 3-6 could occur substantially in parallel. By way of illustration, a first process could store revised location information in an allocated free space portion, a second process could map documents to tokens in a forward index, a third process could process queries by accessing the mature portion and allocated free space portion of postings, and a fourth process could merge the revised token location information into the mature portion. While four processes are described, it is to be appreciated that a greater and/or lesser number of processes could be employed and that lightweight processes, regular processes, threads, and other approaches could be employed.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In one example, a method may be implemented as computer executable instructions. Thus, in one example, a computer-readable medium may store computer executable instructions that if executed by a machine (e.g., processor) cause the machine to perform a method that includes receiving revised tokenized text comprising one or more new tokens, retrieving at least one text index posting for old tokens in the existing tokenized text, invalidating entries associated with the indexed document by recording an invalidation notation in the allocated free space portion of the at least one retrieved posting; and storing token location information corresponding to the revised tokenized text in an allocated free space portion of postings corresponding to the one or more new tokens. While executable instructions associated with the above method are described as being stored on a computer-readable medium, it is to be appreciated that executable instructions associated with other example methods described herein may also be stored on a computer-readable medium.

In one example, data structures may be constructed that facilitate storing data on a computer-readable medium and/or in a data store. Thus, in one example, a computer-readable medium may store a data structure that includes, a first field for data associated with a posting header, a second field for data associated with a mature portion of a posting, a third field for data associated with an allocated free space portion. While three fields are described, it is to be appreciated that a greater and/or lesser number of fields could be employed.

Figure 7:
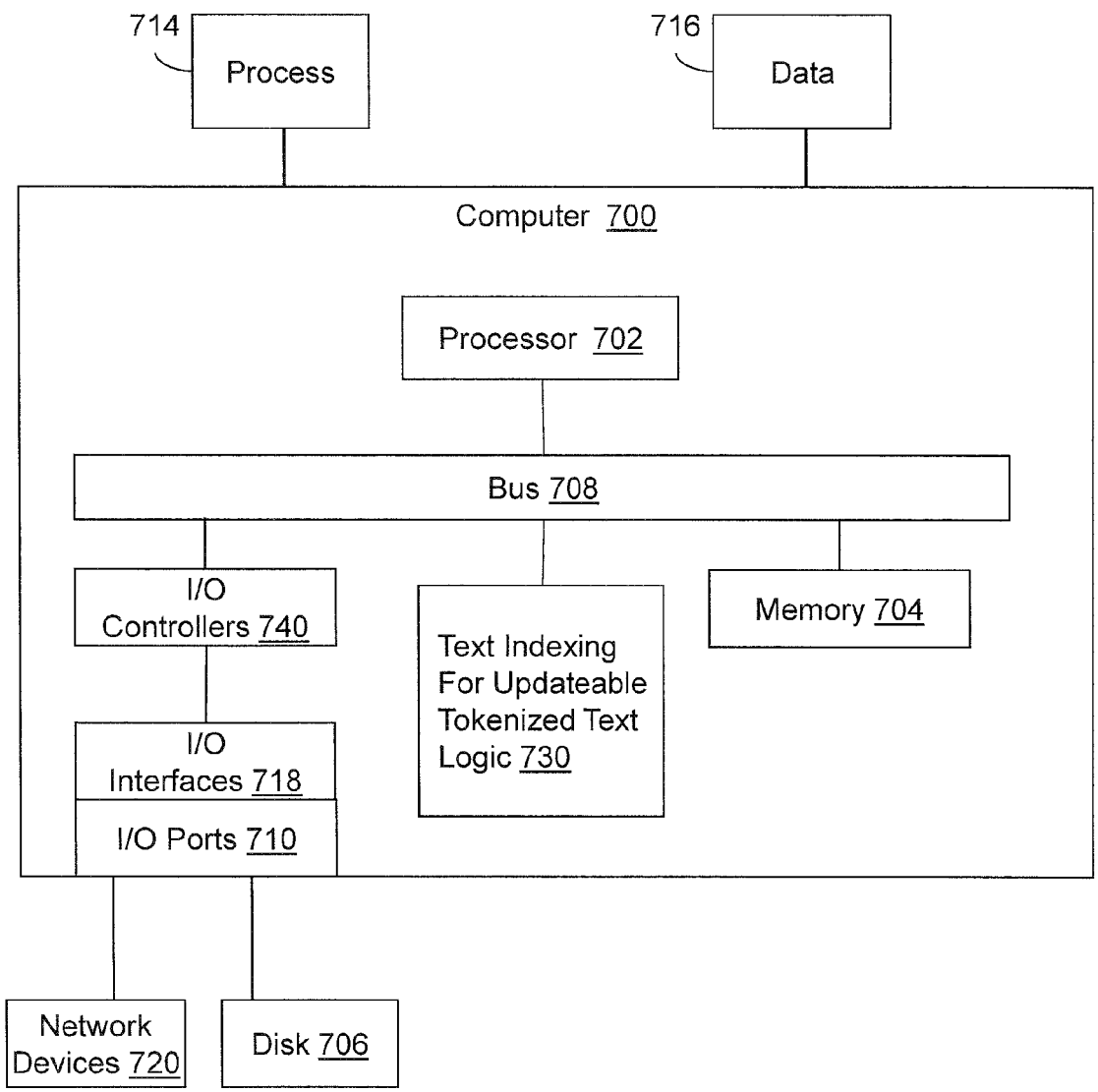
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a text indexing for updateable tokenized text logic 730 configured to facilitate text indexing for updateable tokenized text. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, text indexing for updateable tokenized text logic 730 may provide means (e.g., hardware, software, firmware) for storing token location information corresponding to the revised tokenized text in the allocated free space portion of postings corresponding to the one or more new tokens. The means may be implemented, for example, as an ASIC programmed to text indexing for updateable tokenized text. The means may also be implemented as computer executable instructions that are presented to computer 700 as data 716 that are temporarily stored in memory 704 and then executed by processor 702.

Text indexing for updateable tokenized text logic 730 may also provide means (e.g., hardware, software, firmware) for receiving a query on the documents in the search system; means for retrieving at least one text index posting corresponding to the at least one query token; means for accessing the mature portion and the allocated free space portion of the at least one text index posting to identify documents that contain the at least one query token; and means for returning identified the documents in response to the query.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

"Software", as used herein, includes but is not limited to, one or more executable instructions that cause a computer, processor, or other electronic device to perform functions, actions and/or behave in a desired manner. "Software" does not refer to stored instructions embodied as stored instructions per se (e.g., a program listing). The instructions may be embodied in various forms including routines, algorithms, modules, methods, threads, and/or programs including separate applications or code from dynamically linked libraries.

What is claimed is:

1. A computer-implemented method, comprising:
    accessing a text index that includes postings that map tokens to documents that contain the tokens;
    where each posting includes a mature portion having token location information compiled at a last posting rewrite and an allocated free space portion having revised token location information for tokens received since the last posting rewrite, further where the mature portion is sorted on document identifier, and further where each posting is configured such that both the mature portion and the allocated free space portion are susceptible to query operations for tokens; and
    rewriting a selected posting by:
        removing the revised token location information from the allocated free space portion;
        sorting the revised token location information according to document identifier; and
        merging the sorted revised token location information into the mature portion.

2. The computer-implemented method of claim 1 comprising:

receiving revised tokenized text comprising one or more new tokens, where the revised tokenized text is intended to replace existing tokenized text in an indexed document;

storing token location information corresponding to the revised tokenized text in the allocated free space portion of the postings for the respective one or more new tokens;

retrieving at least one posting for old tokens in the existing tokenized text; and invalidating entries associated with the indexed document by recording an invalidation notation in the allocated free space portion of the at least one retrieved posting.

3. The computer-implemented method of claim 2 comprising:

mapping documents in the search system to tokens contained in documents in a forward index;

consulting a forward index entry for the indexed document to locate text index postings for the old tokens in the existing tokenized text; and rewriting the entry for the indexed document in the forward index to map the indexed document to tokens in the revised tokenized text.

4. The computer-implemented method of claim 1 where the rewriting is performed when an amount of available memory in the allocated free space portion falls below a threshold amount.

5. The computer-implemented method of claim 1 comprising:

receiving a query on the documents in the search system, where the query includes at least one query token;

retrieving at least one posting corresponding to the at least one query token;

accessing the mature portion of the at least one posting to identify documents that contain the at least one query token;

accessing the allocated free space portion of the at least one posting to identify documents that contain the at least one query token; and returning identified the documents in response to the query.

6. The computer-implemented method of claim 5 where accessing the allocated free space portion is performed by:

accessing a posting header to determine a beginning memory location in the posting for the allocated free space portion; and sorting the revised token location information in the allocated free space portion according to document identifier.

7. The computer-implemented method of claim 6 where the sorting is performed by reading the revised token location information in the allocated free space portion into a sorting structure and sorting the revised token location information.

8. The computer-implemented method of claim 7 comprising performing a sorted merge on document identifiers that were identified by accessing the mature portion of the posting and document identifiers that were identified by accessing the allocated free space portion to return identified documents in response to the query.

9. A computing system, comprising:

computer-readable medium configured to store a text index that includes a plurality of postings, where each posting includes a mature portion to store token location information compiled at the last rewrite and an allocated free space portion to store token location information for the tokens received since a last posting rewrite, further where the mature portion is sorted on document identifier, and further where each posting is configured such that both the mature portion and the allocated free space portion are susceptible to query operations for tokens;

a document revision indexing logic configured to store, in the allocated free space portion of a respective posting, revised location information for a revised token in a document, where the revised token is part of revised tokenized text that is intended to replace existing tokenized text in an indexed document; and an index rewriting logic configured to rewrite the posting by:

removing the revised token location information from the allocated free space portion;

sorting the revised token location information according to document identifier; and merging the sorted revised token location information into the mature portion.

10. The computing system of claim 9 where the document revision indexing logic is configured to:

map documents in the search system to tokens contained in documents in a forward index;

consult a forward index entry for the indexed document to locate text index postings for old tokens in the existing tokenized text;

retrieve the postings for the old tokens;

invalidate entries associated with the indexed document by recording an invalidation notation in the allocated free space portion of the at least one retrieved posting; and rewrite the entry for the indexed document in the forward index to map the indexed document to tokens in the revised tokenized text.

11. The computing system of claim 9 further comprising query processing logic configured to access both the mature portion of the postings and the allocated free space portion of the postings to return results to queries.

12. The computing system of claim 11 where the query processing logic is configured to:

sort the revised token location information by reading the revised token location information in the allocated free space portion into a sorting structure and sorting the revised token location information using to sorting structure; and perform a sorted merge on document identifiers that were identified by accessing the mature portion of the text index posting and document identifiers that were identified by accessing the allocated free space portion to return identified documents in response to the query.

13. The computing system of claim 11 where the query processing logic is configured to:

access a text index posting header to determine a beginning memory location for the allocated free space portion; and sort the revised token location information in the allocated free space portion according to document identifier.

14. A computer-readable medium storing computer-executable instructions that when executed by a computer cause the computer to perform a method, the method comprising:

accessing a text index that includes postings that map tokens to documents that contain the tokens, where each posting includes a mature portion having token location information compiled at a last posting rewrite and an allocated free space portion having revised token location information for tokens received since the last posting rewrite, further where the mature portion is sorted on document identifier, and further where each posting is configured such that both the mature portion and the allocated free space portion are susceptible to query operations for tokens; and rewriting a selected posting by:
- removing the revised token location information from the allocated free space portion;
- sorting the revised token location information according to document identifier; and
- merging the sorted revised token location information into the mature portion.

15. The computer-readable medium of claim 14 where the method further includes:
- mapping documents in the search system to tokens contained in documents in a forward index;
- receiving a revised tokenized text comprising one or more new tokens, where the revised tokenized text is intended to replace existing tokenized text in an indexed document;
- consulting a forward index entry for the indexed document to locate text index postings for old tokens in the existing tokenized text; and
- rewriting the entry for the indexed document in the forward index to map the indexed document to tokens in the revised tokenized text.

16. The computer-readable medium of claim 14 where the method further includes:
- receiving a revised tokenized text comprising one or more new tokens, where the revised tokenized text is intended to replace existing tokenized text in an indexed document;
- storing token location information corresponding to the revised tokenized text in the allocated free space portion of the postings corresponding to the one or more new tokens;
- retrieving at least one posting for old tokens in the existing tokenized text; and
- invalidating entries associated with the indexed document by recording an invalidation notation in the allocated free space portion of the at least one retrieved posting.

17. The computer-readable medium of claim 14 where the method further includes:
- receiving a query on the documents in the search system, where the query includes at least one query token;
- retrieving at least one posting corresponding to the at least one query token;
- accessing the mature portion of the at least one posting to identify documents that contain the at least one query token;
- accessing the allocated free space portion of the at least one posting to identify documents that contain the at least one query token;
- performing a sorted merge on document identifiers that were identified by accessing the mature portion of the posting and document identifiers that were identified by accessing the allocated free space portion to return identified documents in response to the query; and
- returning identified the documents in response to the query.

18. The computer-readable medium of claim 17 where the method further includes accessing the allocated free space portion by:
- accessing a posting header to determine a beginning memory location in the posting for the allocated free space portion; and
- sorting the revised token location information in the allocated free space portion according to document identifier by reading the revised token location information in the allocated free space portion into a sorting structure and sorting the revised token location information.

* * * * *

UNITED STATES PATENT AND TRADEMARK OFFICE
CERTIFICATE OF CORRECTION

PATENT NO.        : 9,047,363 B2                                       Page 1 of 1
APPLICATION NO.   : 12/967419
DATED             : June 2, 2015
INVENTOR(S)       : Palakodety et al.

It is certified that error appears in the above-identified patent and that said Letters Patent is hereby corrected as shown below:

In the specification

Column 2, line 58, delete "indentifies" and insert -- identifies --, therefor.

Signed and Sealed this
Ninth Day of February, 2016

Michelle K. Lee
*Director of the United States Patent and Trademark Office*